United States Patent Office 3,420,821
Patented Jan. 7, 1969

3,420,821
TRIAZINYL-STILBENE REACTIVE
OPTICAL BRIGHTENERS
Erich Schinzel, Frankfurt am Main, and Karl Heinz
Lebkücher, Hofheim, Taunus, Germany, assignors
to Farbwerke Hoechst Aktiengesellschaft vormals
Meister Lucius & Bruning, Frankfurt am Main,
Germany, a corporation of Germany
No Drawing. Filed June 21, 1965, Ser. No. 465,748
Claims priority, application Germany, June 30, 1964,
F 43,307
U.S. Cl. 260—240    3 Claims
Int. Cl. C09b 23/16; C09b 23/00; C09b 55/00

ABSTRACT OF THE DISCLOSURE

Aminostilbene compounds, useful as optical brighteners, which can be fixed on fibrous materials and foils having hydroxyl groups or reactive hydrogen atoms in the presence of agents having alkaline action.

---

The present invention relates to optical brighteners of the kind characterized in the following, which can be fixed on fibrous materials and foils having a hydroxyl group or an active hydrogen atom, by action of agents having alkaline action, because of their content of reactive groups.

The optical brighteners of the present invention are water-soluble derivatives of the aminostilbene which contain the radical of an esterified and, if desired, substituted amino-aryl-β-hydroxyethyl-sulfone or amino-aryl-vinylsulfone linked at least once through a 1.3.5-triazine ring. The optical brighteners can be used for obtaining brilliant optical brightenings of sometimes excellent fastness properties on fibrous materials and foils of a different kind.

The derivatives of the aminostilbene mentioned above are, in particular, compounds of the general formula

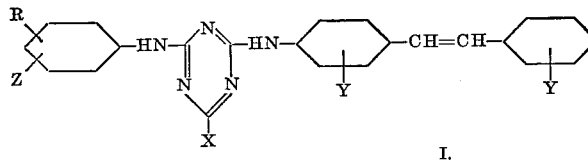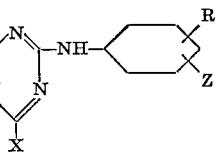

I.

in which Y represents hydrogen or a group imparting solubility in water, such as a carboxyl group, a sulfonic acid amide group, a β-hydroxyethylsulfone group or, preferably, a sulfonic acid group, in particular, in 2,2'-position, R represents a hydrogen atom, an alkyl radical or an alkoxy radical of low molecular weight containing preferably 1–3 carbon atoms, X represents $NH_2$ or the radical of a primary or secondary aliphatic amine of low molecular weight, preferably of such an amine with solubilizing groups, for example, the radicals of aliphatic amino-sulfonic acids, amino-carboxylic acids or amino-alcohols such as taurine, methyl-taurine, glycocoll, sarcosine, and ethanolamine, and Z represents the grouping $-SO_2-CH=CH_2$ or $-SO_2-CH_2-CH_2-O-A$, A standing for the radical of a polybasic acid, for example, the phosphoric acid radical or preferably the sulfuric acid radical.

Said novel reactive aminostilbene-derivatives can serve for optically brightening foils and fibrous materials of all kinds, for example, of natural and man-made textile fibers, such as wool, silk, synthetic protein fibers, polyamide fibers, but preferably of cellulose fibers such as cotton, hemp, linen, of regenerated or acetylated cellulose, particularly good effects being obtained with the corresponding mixtures of fibers. The materials to be brightened can be used in any form, for example, as loose fibrous material, as filaments, flocks, yarns, woven fabrics, knit fabrics or felts. Furthermore, also foils and other materials of fibrous structure such as paper board, paper, artificial leather and the like can be treated.

The particular advantage of the said novel reactive aminostilbene derivatives compared with the known products, consists, above all, in imparting a very brilliant white tint of good fastness to light, which is extraordinarily stable to aqueous solutions and inorganic solvents, to the fibrous materials treated with them. With these novel reactive aminostilbene derivatives there can be obtained, for example on cotton, very brilliant brightenings whose degree of white is practically not weakened nor is their tint changed by the action of dilute acids and alkalies, dilute hypochlorite solutions and peroxide solutions as well as by the treatment with the usual organic solvents, when the material is washed at the boil.

The fixation of the novel reactive aminostilbene derivatives on the materials to be brightened is carried out in the presence of agents having an alkaline action. In this process, generally, a pH-value above 9, suitably in the range of pH 11 to 12 is maintained. The fixation can be carried out at room temperature or at elevated temperatures up to about 100° C. It is preferable to operate at room temperature or at moderately elevated temperature in the range of about 30 to 70° C.

As agents having an alkaline action for fixing the reactive optical brighteners there are mentioned all water-soluble alkaline compounds, as far as they themselves cannot react with the reactive aminostilbene derivatives, due to hydrogen atoms which may be present. As suitable compounds having an alkaline action there are, above all, mentioned alkali metal hydroxides, if desired, in the presence of buffer mixtures, preferably, however, alkali metal carbonates and tertiary alkali metal phosphates; for economical reasons, first of all, potassium and sodium compounds are used.

For optically brightening foils and fibrous materials the novel reactive aminostilbene derivatives are applied to the material to be brightened from an aqueous solution and, at the same time or subsequently, the fixation is carried out in the presence of agents having an alkaline action.

The novel water-soluble aminostilbene derivatives are adsorbed for example, substantively by materials of natural or regenerated cellulose and, there, they are more or less closely fixed, depending on the constitution. When the said materials by which the water-soluble brightening compounds are adsorbed, at first only substantively, are treated with substances having alkaline action, the acid radicals of the brightening compounds, which are linked in the form of esters, are split off while forming vinylsulfonyl groups which can add themselves to the hydroxyl groups of the cellulose. In this manner a close linkage of the brightening molecules to the material to be brightened is achieved.

It is not necessary to carry out the optical brightening in two stages by allowing the brighteners, first to be adsorbed by the material to be brightened and subsequently fixing the material by action of agents having an alkaline action. In a changed working method, it is, however, possible to add the agents having an alkaline action to the aqueous bath of the brighteners from the beginning. The acid radicals of the brightening agents which are linked in the form of esters, are split off already in the brightening bath, i.e., before the brightening molecules are adsorbed by the material to be brightened. With this method, too, a stable linkage of the brightening molecule to the material to be brightened is achieved.

It is possible to subject the novel derivatives of the aminostilbene also in an aqueous solution to the action of agents having an alkaline action, to isolate the vinylsulfonyl compounds of the general formula

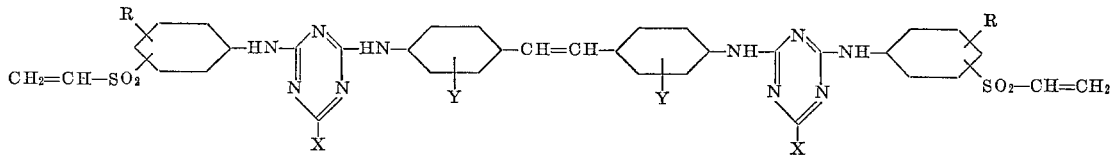

II.

which compounds have been formed while acid radicals linked in the form of esters have split off, and to use these compounds for brightening foils and fibrous materials in the presence of agents having an alkaline action. According to this method, too, a stable linkage of the brightening molecule to the material to be brightened is achieved.

The novel reactive aminostilbene derivatives can be used for optically brightening foils and fibrous materials in concentrations adapted to the prevailing circumstances. In general, there are used amounts in the range of about 0.01% to about 1.0%, preferably amounts of 0.05% to 0.6% calculated on the weight of the goods to be brightened.

The novel reactive aminostilbene derivatives can be prepared according to different processes. For example, cyanuric acid chloride can be reacted in any desired order with a derivative of the aminostilbene, an amino-aryl-β-hydroxyethylsulfone, which may be substituted, and a primary or secondary aliphatic amine containing preferably solubilizing groups and the reaction product can be subjected to the action of a polybasic acid, preferably to concentrated sulfuric acid.

Another working method consists in reacting cyanuric acid chloride with a derivative of the aminostilbene, exchanging the second halogen atom for ammonia or the radical of a primary or secondary aliphatic amine containing preferably solubilizing groups, and reacting the third halogen atom with an esterified and, if desired, substituted amino-aryl-β-hydroxyethylsulfone or amino-aryl-vinyl-sulfone. Of a particular industrial interest is the condensation of 2 mols of cyanuric chloride with 1 mol of 4,4'-diamino-stilbene-2,2'-disulfonic acid, 2 mols of amino-aryl-β-hydroxyethylsulfone substituted, if dersired, by an alkyl or alkoxy radical of low molecular weight, and at least 2 mols of ammonia or of a primary or secondary aliphatic amine of low molecular weight, containing preferably solubilizing groups, and the esterification of the isolated and dried reaction product with concentrated sulfuric acid.

There are mentioned as amino-aryl-β-hydroxyethylsulfones, for examples, 4-amino-phenyl-β-hydroxyethylsulfone, 3-amino-phenyl-β-hydroxyethylsulfone, 3-amino-4-methyl-phenyl-β-hydroxyethylsulfone, 3-amino-6-methyl-phenyl-β-hydroxyethylsulfone, and the 3-amino-4-methoxy-phenyl-β-hydroxyethylsulfone. Among the primary and secondary aliphatic amines of low molecular weight, which can be used, there are mentioned for example, ethylamine, diethylamine, ethanolamine, diethanolamine, glycocoll, sarcosine, taurine and methyl-taurine.

The reaction product obtained from cyanuric chloride, a derivative of aminostilbene, an aminoaryl-β-hydroxyethylsulfone which is substituted, if desired, and ammonia or a primary or secondary aliphatic amine of low molecular weight, in a manner known as such, is introduced into the triple to quintuple amount of concentrated sulfuric acid for esterification at a temperature of 20° to 25° C. and the mixture is stirred for 12 hours at room temperature. Subsequently, the quadruple amount of ice (calculated on the sulfuric acid used) is added, stirring is continued for 1 to 2 hours, the precipitated ester is filtered with suction, re-dissolved in a large amount of water and adjusted to pH 7 in the cold by introducing sodium bicarbonate. The neutral ester is separated by addition of salt, filtered with suction, washed with sodium chloride solution and dried at a temperature of 60° C. The compounds obtained correspond to the Formula I in which Z is —SO₂—CH₂—CH₂—O—SO₃Na.

In order to prepare the vinylsulfonyl compounds of the general Formula II in which the radicals Y, R and X have the meanings indicated under I, the compounds I (Z=—SO₂—CH₂—CH₂—O—SO₃Na) are dissolved in water and adjusted dropwise to pH-value >9, preferably to pH 11.5 with dilute 2 N-sodium hydroxide solution. The alkaline solution is stirred at room temperature for about 30 minutes and, subsequently, the solution is neutralized by adding dilute acetic acid. The vinylsulfonyl compounds are separated by addition of salt, filtered with suction, washed with sodium chloride solution until they are free from sulfate ions, and dried at a temperature of 60° C.

The following examples serve to illustrate the invention, but they are not intended to limit it thereto.

EXAMPLE 1

The compound of the constitution

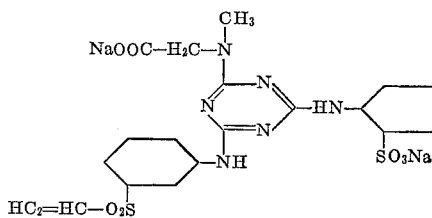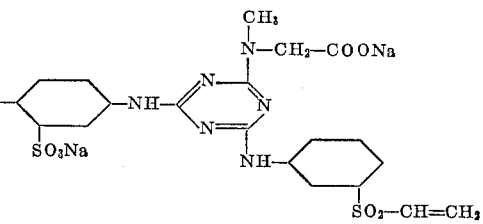

III.

(brightener) was applied to a bleached cotton fabric according to two different recipes:

(a) Substantatively at a goods-to-liquor ratio of 1:20 during a period of 60 minutes at a temperature of 60° C. while using
    0.15 g./l. of the brightener and
    5 g./l. of Na₂SO₄ anhydrous (b) Reactively at a goods-to-liquor ratio of 1:20 during a period of 60 minutes at a temperature of 60° C. while using
    0.15 g./l. of the brightener
    50 g./l. of Na₂SO₄ anhydrous and
    1 g/l. of Na₃PO₄

The remission values given in the following, which were determined with a Zeiss-Elrepho apparatus (MgO=100%) in the above and the following examples, show that the optical brightening according to the process of reactive brightening (b) leads to a higher degree of white than the process of substantive brightening (a).

| Remission (mμ) | Dyeing (a) percent | Dyeing (b) percent |
|---|---|---|
| 420 | 76.2 | 77.1 |
| 460 | 100.9 | 103.1 |

EXAMPLE 2

A bleached cotton fabric was brightened (a) Substantively at a goods-to-liquor ratio of 1:20 during a period of 60 minutes at a temperature of 60° C. with

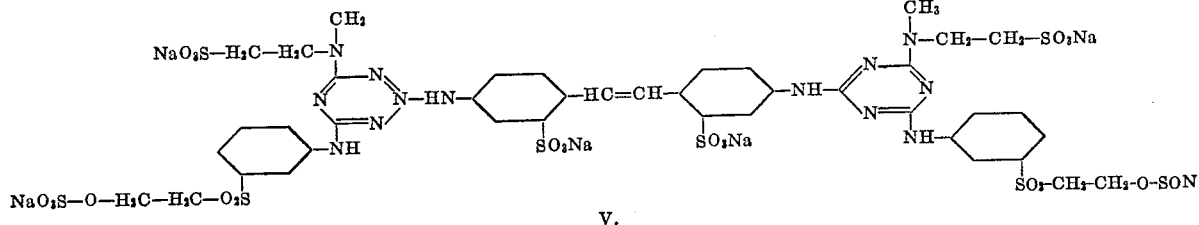

0.15 g./l. of the brightener of the Formula IV and
5 g./l. of Na₂SO₄ anhydrous and (b) Reactively at a goods-to-liquor ratio of 1:20 during a period of 60 minutes at a temperature of 60° C. with
0.15 g./l. of the brightener of the Formula IV
50 g./l. of Na₂SO₄ anhydrous and
5 g./l. of Na₃PO₄.

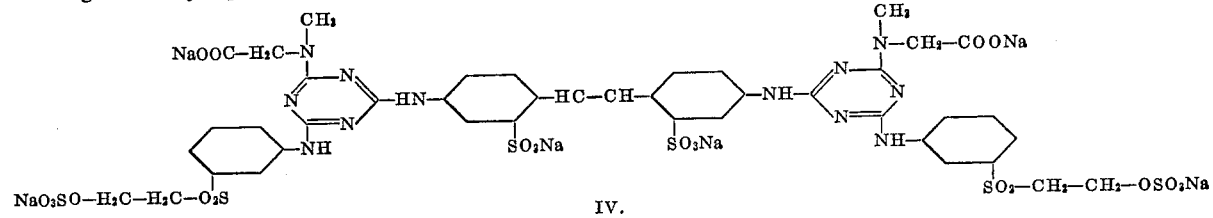

IV.

The two optically brightened fabrics were bleached, under the same condition, with 5 ml./l. of H₂O₂ of 35%,
5 ml./l. of water glass and
0.1 g./l. of MgCl₂·6H₂O.

at a goods-to-liquor ratio of 1:30 during a period of 1 hour at a temperature of 90° C. and a pH-value of 10.5. In this process the remission of brightening (a) decreased from 101.8% to 96.9% whereas the remission of brightening (b) increased from 102.3% to 106.5%. The indicated values refer to a wave length of 460 mμ.

EXAMPLE 3

A bleached cotton fabric was brightened (a) Substantively at a goods-to-liquor ratio 1:20 during a period of 60 minutes at a temperature of 60° C. with
0.15 g./l. of the brightener of the Formula III and
5 g./l. of Na₂SO₄ anhydrous and (b) Reactively at a goods-to-liquor ratio of 1:20 during a period of 60 minutes at a temperature of 60° C. with
0.15 g./l. of the brightener of the Formula III,
50 g./l. of Na₂SO₄ anhydrous and
1 g./l. of Na₃PO₄.

The two fabrics bleached in this manner were impregnated with a solution of 300 g./l. of glacial acetic acid and squeezed to 90 to 100% of liquor adsorption. Subsequently, the fabrics thus treated were dried on a glass plate at room temperature. The remission of the substantive dyeing (a) decreased by about 5% from 100.1% to 95.3% by the subsequent acid treatment, whereas the reactive brightening lost only 2% of its starting remission from 103.5 to 101.3% by this treatment. The values refer to a length wave of 460 mμ.

EXAMPLE 4

A bleached cotton fabric was brightened (a) Substantively at a goods-to-liquor ratio 1:20 during a period of 60 minutes at a temperature of 60° C. with
0.3 g./l. of the brightener of the Formula V and
5 g./l. of Na₂SO₄ anhydrous and (b) Reactively at a goods-to-liquor ratio of 1:20 during a period of 60 minutes at a temperature of 60° C. with
0.3 g./l. of the brightener of the Formula V
50 g./l. of Na₂SO₄ anhydrous and
5 g./l. of Na₃PO₄.

The cotton samples thus brightened were washed at a goods-to-liquor ratio of 1:50 with 2 g./l. of Na₂CO₃ anhydrous
5 g./l. of Marseilles soap.

In order to increase the flooding of the bath, the autoclave which rotated on its own axis for 4 hours in a closed state contained 10 steel balls. The temperature of the washing bath was 95° C.

The remission of the dyeing (a) decreased by about 0.5% (from 100.2 to 99.7%) whereas the remission of the reactively linked brightener increased by about 0.6% (from 100.4 to 101.1%). The values refer to a length wave of 460 mμ.

EXAMPLE 5

A bleached cotton fabric was brightened (a) Substantively at a goods-to-liquor ratio of 1:20 during a period of 60 minutes at a temperature of 60° C. with
0.2 g./l. of the brightener of the Formula III and
5 g./l. of Na₂SO₄ anhydrous and (b) Reactively at a goods-to-liquor ratio of 1:20 during a period of 60 minutes at a temperature of 60° C. with
0.2 g./l. of the brightener of the Formula III,
50 g./l. of Na₂SO₄ anhydrous and
1 g./l. of Na₃PO₄.

The brightened fabric obtained according to (b) was soaped with a solution of 0.5 g./l. of the sodium salt of an oleyl-25 methyltauride for 5 minutes at a temperature of 70° C.

Subsequently, the two fabrics were extracted with a solution consisting of:

| | Parts by volume |
|---|---|
| Dimethylformamide (DMF) | 200 |
| Water | 800 | at a goods-to-liquor ratio of 1:20 during a period of 10 minutes at a temperature of 80° C.

As can be seen from the values indicated in the following, the remission values of the substantive brightening (a) show a pronounced decrease by the aftertreatment with a mixture of dimethylformamide and water whereas the remission values of the reactive brightening remain practically unchanged.

Length wave, mµ _____ 460
Brightening (a) untreated _____percent__ 103.3
Brightening (a) treated subs. w. DMF/water
   percent__ 95.7
Brightening (b) soaped _____do____ 106.7
Brightening (b) treated subs. w. DMF/water
   percent__ 107.0

Instead of using the compounds mentioned in Examples 1 to 5 there can also be used the reactive optical brighteners indicated in the following table:

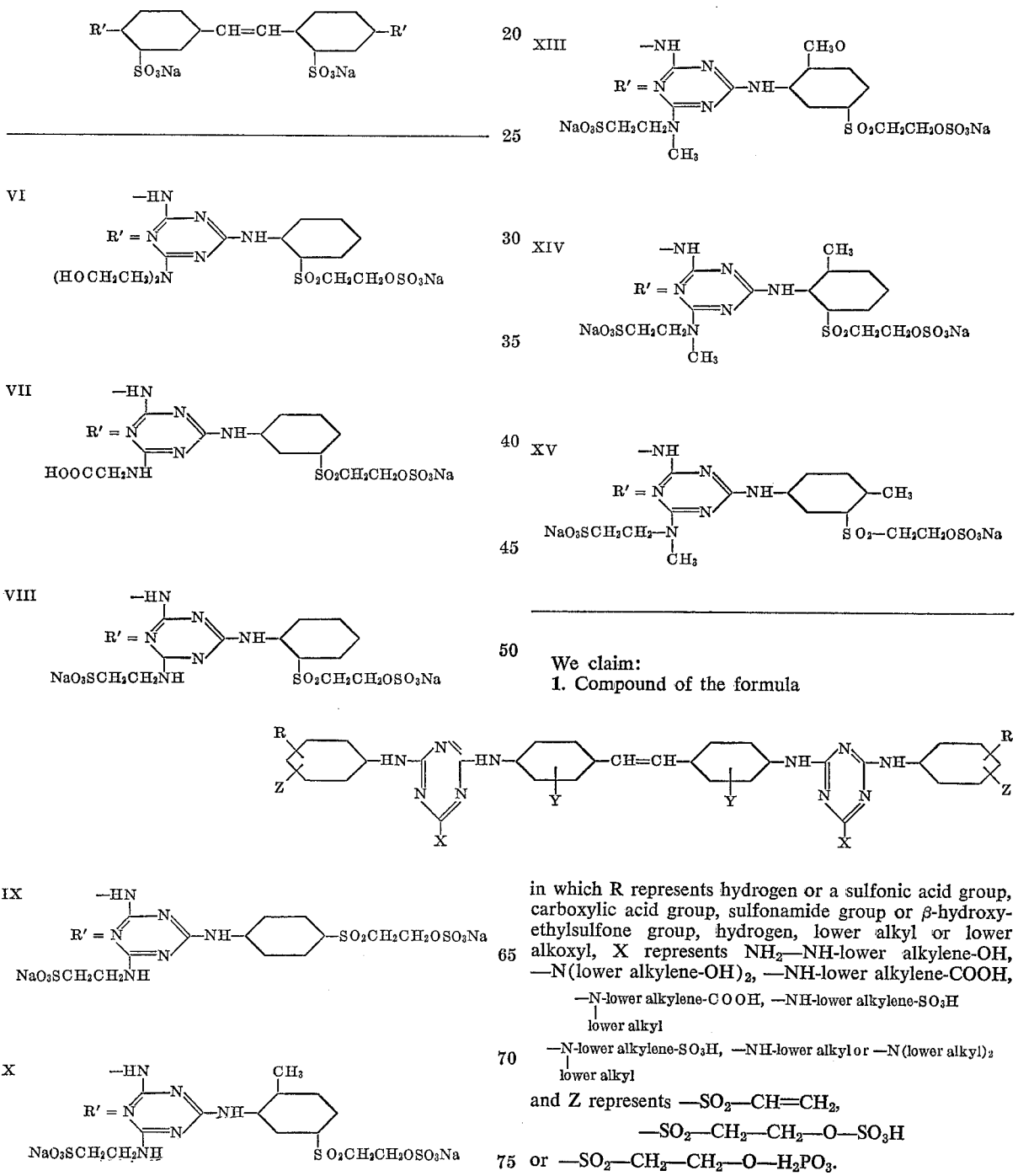

We claim:
1. Compound of the formula in which R represents hydrogen or a sulfonic acid group, carboxylic acid group, sulfonamide group or β-hydroxyethylsulfone group, hydrogen, lower alkyl or lower alkoxyl, X represents NH₂—NH-lower alkylene-OH, —N(lower alkylene-OH)₂, —NH-lower alkylene-COOH, —N-lower alkylene-COOH, —NH-lower alkylene-SO₃H
|
lower alkyl —N-lower alkylene-SO₃H, —NH-lower alkyl or —N(lower alkyl)₂
|
lower alkyl and Z represents —SO₂—CH=CH₂,

—SO₂—CH₂—CH₂—O—SO₃H or —SO₂—CH₂—CH₂—O—H₂PO₃.

2. The compound of the formula
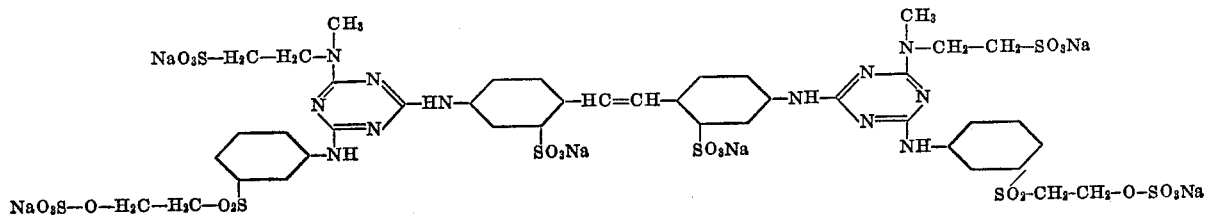
3. The compound of the formula
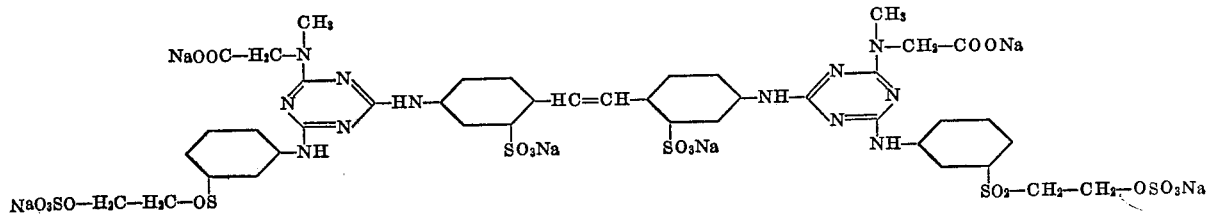
References Cited
UNITED STATES PATENTS
3,046,075 7/1962 Kantner et al. ____ 260—249 XR
3,066,005 11/1962 Wedemeyer et al. ____ 8—54.2
FOREIGN PATENTS
627,915 8/1963 Belgium.
OTHER REFERENCES
Weymann: Texil-Praxis, 1958, pages 1056 to 1058.
JOHN D. RANDOLPH, *Primary Examiner.*
U.S. Cl. X.R.
117—33.5; 252—301.2

UNITED STATES PATENT OFFICE
CERTIFICATE OF CORRECTION

Patent No. 3,420,821            Dated January 7, 1969

Inventor(s)  Erich Schinzel and Karl Heinz Lebkucher

It is certified that error appears in the above-identified patent and that said Letters Patent are hereby corrected as shown below:

Columns 3 and 4, Formula III, the portion of the formula reading

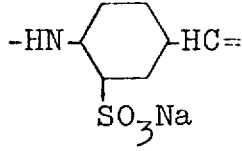   should read   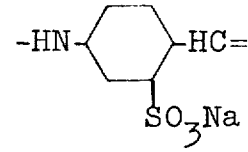

and the portion of the formula reading

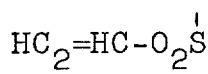   should read   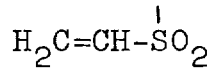

Columns 5 and 6, Formula V, the portion of the formula reading

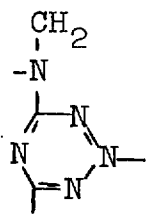   should read   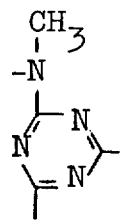

and the portion, at the extreme right end, of the formula reading

-O-SON   should read   -O-SO$_3$Na

Columns 5 and 6, Formula IV, the portion of the formula reading

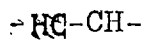   should read   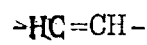

PO-1050
(5/69)

UNITED STATES PATENT OFFICE
CERTIFICATE OF CORRECTION

Patent No. 3,420,821                     Dated January 7, 1969

Inventor(s) Erich Schinzel and Karl Heinz Lebkucher

It is certified that error appears in the above-identified patent and that said Letters Patent are hereby corrected as shown below:

Column 5, line 42, "condition" should read --conditions--; line 45, the period (.) after "$6H_2O$" should be deleted; line 68, the comma (,) should be replaced by a period (.);

Column 6, line 3, after "ratio" insert --of--; line 63, after "oleyl", delete --25--;

Column 7, line 20, the portion of the formula reading

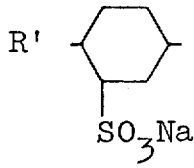          should read          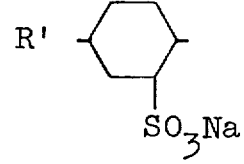

Formula VI through XV, in each instance the portion of the formula reading
$$R' =$$
should be moved to the left and away from each formula as in the text of the application; Formulae VI, VIII and XIV, in each instance, the portion of the formula reading

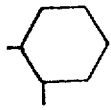          should read          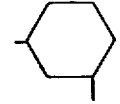

Formula VII, the portion of the formula reading

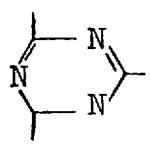          should read          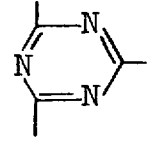

PO-1050
(5/69)

UNITED STATES PATENT OFFICE
CERTIFICATE OF CORRECTION

Patent No. 3,420,821   Dated January 7, 1969

Inventor(s) Erich Schinzel and Karl Heinz Lebkucher

It is certified that error appears in the above-identified patent and that said Letters Patent are hereby corrected as shown below:

Column 8, (claim 1), line 62, "R" should be --Y--; line 64, becore "hydrogen" insert -- R represents--; line 65, "$NH_2$-NH-lower" should read --$NH_2$,-NH-lower--; line 70, "lower alkylor" should read --lower alkyl or--;

Claim 3, the portion of the formula reading $NaO_3SO-H_2C-H_2C-OS$   should read   $NaO_3SO-H_2C-H_2C-O_2S$

SIGNED AND
SEALED
JUL 21 1970

(SEAL)
Attest:

Edward M. Fletcher, Jr.
Attesting Officer

WILLIAM E. SCHUYLER, JR.
Commissioner of Patents